US006879353B2

(12) United States Patent
Moon et al.

(10) Patent No.: US 6,879,353 B2
(45) Date of Patent: Apr. 12, 2005

(54) ARRAY SUBSTRATE FOR IPS MODE LIQUID CRYSTAL DISPLAY DEVICE

(75) Inventors: Hong-Man Moon, Gyeongsangbuk-do (KR); Deok-Won Lee, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/025,862

(22) Filed: Dec. 26, 2001

(65) Prior Publication Data

US 2002/0085136 A1 Jul. 4, 2002

(30) Foreign Application Priority Data

Dec. 29, 2000 (KR) ........................................ 2000-85007

(51) Int. Cl.$^7$ ............................................ G02F 1/1333
(52) U.S. Cl. ........................ 349/40; 349/139; 349/149
(58) Field of Search ........................... 349/40, 139, 149

(56) References Cited

U.S. PATENT DOCUMENTS

| | | | |
|---|---|---|---|
| 5,327,267 A | | 7/1994 | Aoki et al. |
| 5,598,285 A | | 1/1997 | Kondo et al. ................. 349/39 |
| 5,838,037 A | | 11/1998 | Masutani et al. ........... 257/296 |
| 5,889,568 A | * | 3/1999 | Seraphim et al. ............. 349/73 |
| 5,926,234 A | * | 7/1999 | Shiraki et al. ................ 349/40 |
| 5,946,060 A | | 8/1999 | Nishiki et al. ................ 349/48 |
| 5,990,987 A | | 11/1999 | Tanaka ......................... 349/43 |
| 6,028,653 A | | 2/2000 | Nishida ....................... 349/141 |
| 6,043,971 A | * | 3/2000 | Song et al. .................. 361/111 |
| 6,097,454 A | | 8/2000 | Zhang et al. .................. 349/43 |
| 6,108,057 A | * | 8/2000 | Kusanagi ...................... 349/40 |
| 6,493,047 B2 | * | 12/2002 | Ha .............................. 349/40 |

FOREIGN PATENT DOCUMENTS

| | | |
|---|---|---|
| JP | 09-005764 | 1/1997 |
| JP | 09-073101 | 3/1997 |
| JP | 09-101538 | 4/1997 |
| JP | 09-105908 | 4/1997 |
| KR | 2000-0066955 | 11/2000 |

OTHER PUBLICATIONS

R. Kieler et al.; "In–Plane Switching of Nematic Liquid Crystals"; Japan Display '92; pp. 547–550.
M. Oh–e, et al.; "Principles and Characteristics of Electro–Optical Behaviour with In–Plane Switching Mode"; Asia Display '95; pp. 577–580.
M. Ohta et al,; "Development of Super–TFT–LCDs with In–Plane Switching Display Mode"; Asia Display '95; pp. 707–710.
S. Matsumoto et al.; Display Characteristics of In–Plane Switching (IPS) LCDs and a Wide–Viewing–Angle 14.5–in. OPS TFT–LCD; Euro Display '96; pp. 445–448.
H. Wakemoto et al.; "An Advanced In–Plane Switching Mode TFT–LCD"; SID 97 Digest ; pp. 929–932.
S.H. Lee et al., High–Transmittance, Wide–Viewing–Angle Nematic Liquid Crystal Display Controlled by Fringe–Field Switching; Asia Display '98; pp. 371–374.

* cited by examiner

Primary Examiner—Tom Thomas
Assistant Examiner—Matthew C Landau
(74) Attorney, Agent, or Firm—McKenna Long & Aldridge LLP (57) ABSTRACT

The present invention provides an array substrate for an IPS-LCD device. The array substrate has an image display area and an image non-display area. A plurality of pixels are disposed in the display area. A plurality of switching devices each of that is disposed in each pixel are on the substrate. First and second lines apply signals to each switching device, and a plurality of first electrodes on the substrate are connected to each switching device. A plurality of second electrodes on the substrate are spaced apart from each first electrode. A plurality of electrostatic discharge devices are arranged in the non-display area, and each electrostatic discharge device is at a distance of more than one pixel pitch. A plurality of pads are arranged in the non-display area. A plurality of first connecting lines each of that connects each pixel to each electrostatic discharge device are arranged in the non-display area. A plurality of second connecting lines connect the electrostatic discharge devices to the pads.

17 Claims, 6 Drawing Sheets

*FIG. 1*
*(RELATED ART)*

*FIG. 2*
*(RELATED ART)* off state

FIG. 3A
*(RELATED ART)*

FIG. 3B
*(RELATED ART)* on state

ARRAY SUBSTRATE FOR IPS MODE LIQUID CRYSTAL DISPLAY DEVICE

This application claims the benefit of Korean Patent Application No. 2000-85007, filed on Dec. 29, 2000, which is hereby incorporated by reference as if fully set forth herein.

BACKGROUND OF THE INVENTION

1. Field of the Invention

The present invention relates to liquid crystal display devices. More particularly it relates to liquid crystal display devices implinting in-plane switching (IPS) where an electric field to be applied to liquid crystals is generated in a plane parallel to a substrate.

2. Discussion of the Related Art

A liquid crystal display device uses the optical anisotropy and polarization properties of liquid crystal molecules to produce an image. Liquid crystal molecules have a definite orientational alignment as a result of their long, thin shapes. That orientational alignment can be controlled by an applied electric field. In other words, as an applied electric field changes, so does the alignment of the liquid crystal molecules. Due to the optical anisotropy, the refraction of incident light depends on the orientational alignment of the liquid crystal molecules. Thus, by properly controlling an applied electric field a des red light image can be produced.

Of the different types of known LCDs, active matrix LCDs (AM-LCDs), which have thin film transistors and pixel electrodes arranged in a matrix form, are the subject of significant research and development because of their high resolution and superiority in displaying moving images.

LCD devices have wide application in office automation (OA) equipment and video units because they are light and thin and have low power consumption characteristics. The typical liquid crystal display (LCD) panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors (TFTs) and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

Figure 1:
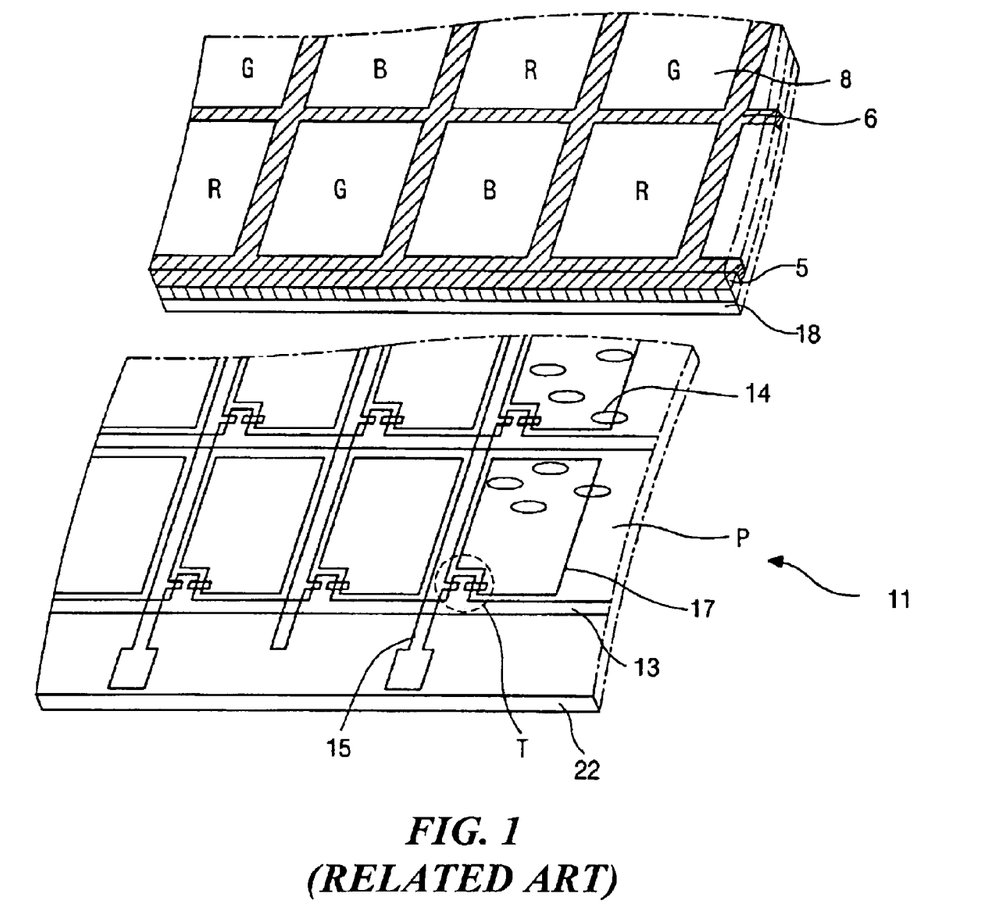
FIG. 1 is the configuration of a conventional liquid crystal display (LCD) device.

FIG. 1 shows a conventional LCD device. The LCD device 11 includes an upper substrate 5 and a lower substrate 22 with a liquid crystal layer 14 interposed therebetween. The upper substrate 5 and the lower substrate 22 are commonly referred to as a color filter substrate and an array substrate, respectively. Within the upper substrate 5 and upon the surface opposing the lower substrate 22, a black matrix 6 and a color filter layer 8 are formed in the shape of an array matrix and inclue a plurality of red (R), green (G), and blue (B) color filters so that each color filter is sur rounded by corresponding portions of the black matrix 6. Additionally, a common electrode 18 is formed on the upper substrate 5 to cover the color filter layer 8 and the black matrix 6. In the lower substrate 22 and upon the surface opposing the upper substrate 5, a thin film transistors (TFTs) "T" are formed in an array matrix corresponding to the color filter layer 7. A plurality of crossings gate lines 13 and data lines 15 are positioned such that each TFT "T" is located adjacent to each crossover point of the gate lines 13 and the data lines 15. Furthermore, a plurality of pixel electrodes 17 are formed on a pixel region "P" defined by the gate lines 13 and the data lines 15 of the lower substrate 22. The pixel electrode 17 includes a transparent conductive material having good transmissivity such as indium-tin-oxide (ITO) or indium-zinc-oxide (ITO), for example.

In the LCD device 11 of FIG. 1, a scanning signal is applied to a gate electrode of the TFT "T" through the gate line 13, while a data signal is applied to a source electrode of the TFT "T" through the data line 15. As a result, the liquid crystal molecules of the liquid crystal layer 14 are aligned and arranged by operation of the TFT "T," and incident light passing through the liquid crystal layer 14 is controlled to display an image.

As described above, since the pixel and common electrodes 17 and 18 of the conventional LCD device are positioned on the lower and upper substrates 22 and 5, respectively, the electric field induced between them is perpendicular to the lower and upper substrates 22 and 5. The described liquid crystal display device has advantages of high transmittance and a high aperture ratio. Furthermore, because the common electrode 18 on the upper substrate 5 acts as a ground, the liquid crystal is shielded from static electricity.

However, the conventional LCD device having the longitudinal electric field has a drawback in that they have a very narrow viewing angle. In order to solve the problem of narrow viewing angle, in-plane switching liquid crystal display (IPS-LCD) devices have been proposed. The IPS-LCD devices typically include a lower substrate where a pixel electrode and a common electrode are disposed, an upper substrate having no electrode, and a liquid crystal interposed between the upper and lower substrates. A detailed explanation about operation modes of a typical IPS-LCD panel will be provided referring, to FIGS. 2 and 3A to 3D.

Figure 2:
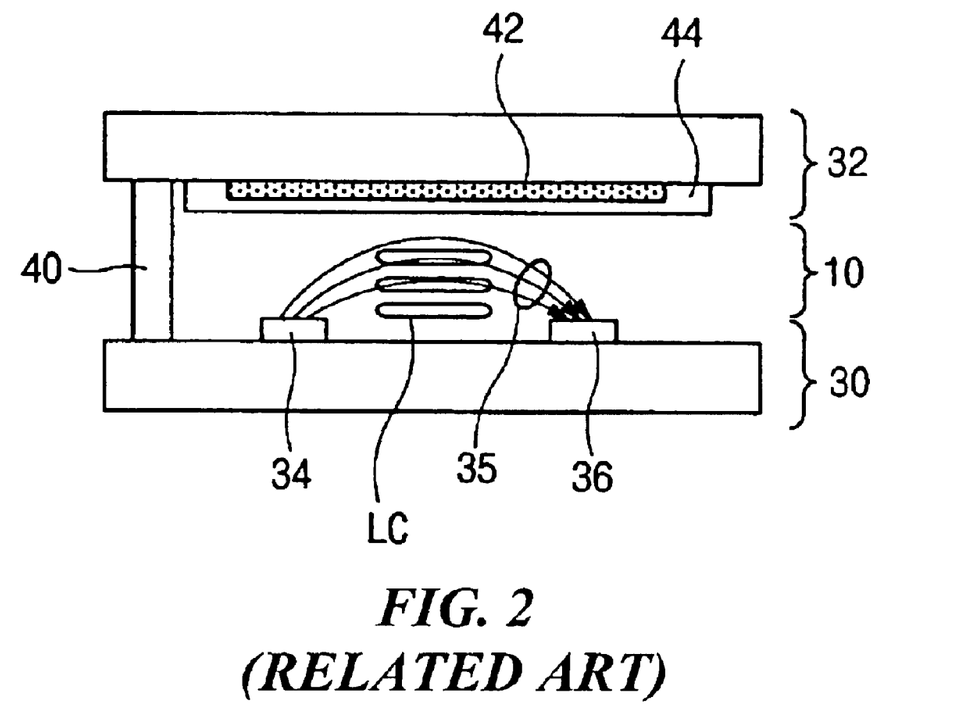
FIG. 2 is a cross-sectional view illustrating a conventional in-plane switching mode (IPS) LCD device.

As shown in FIG. 2, lower and upper substrates 30 and 32 are spaced apart from each other, and a liquid crystal layer 10 is interposed therebetween. The lower and upper substrates 30 and 32 are often referred to as an array substrate and a color filter substrate, respectively. On the lower substrate 30 are a pixel electrode 34 and a common electrode 36. The pixel and common electrodes 34 and 36 are aligned parallel to ea(h other. On a surface of the upper substrate 32 is a color filter layer 42 that is commonly positioned between the pixel electrode 34 and the common electrode 36 of the lower substrate 30. An overcoat layer 44, which protects the color filter layer 42, is formed on the color filter layer 42. A voltage applied across the pixel and common electrodes 34 and 36 produces an electric field 35 through the liquid crystal "LC." The liquid crystal "LC" has a positive dielectric anisotropy, and thus it aligns parallel to the electric field 35. An edge sealant 40 is formed around the edges of the lower and upper substrates 30 and 32, and bonds the upper substrate 32 to the lower substrate 30 to prevent leakage of the liquid crystal "LC".

Figure 3A:
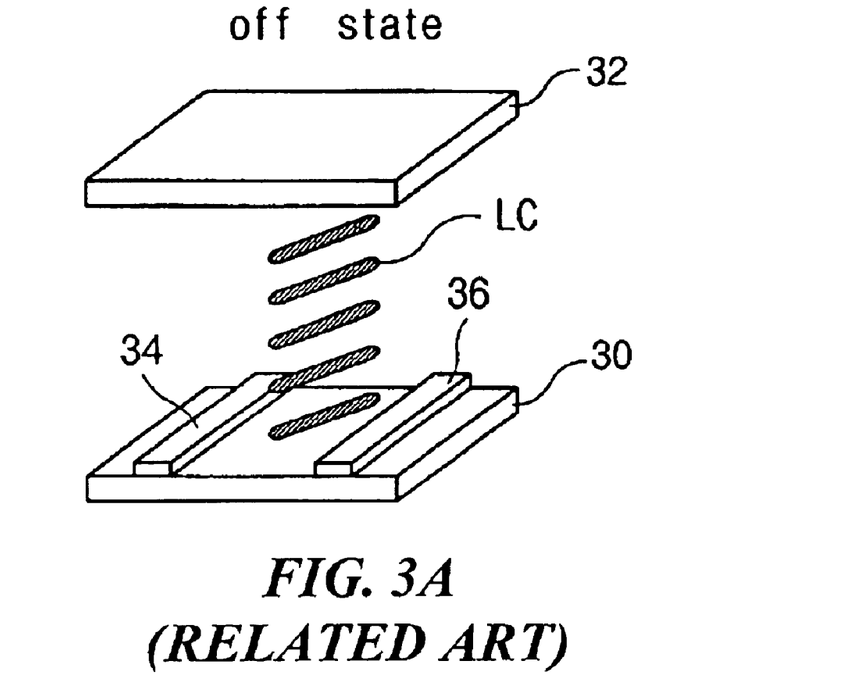
FIGS. 3A to 3D illustrate the operation of the device of FIG. 2.
Figure 3B:
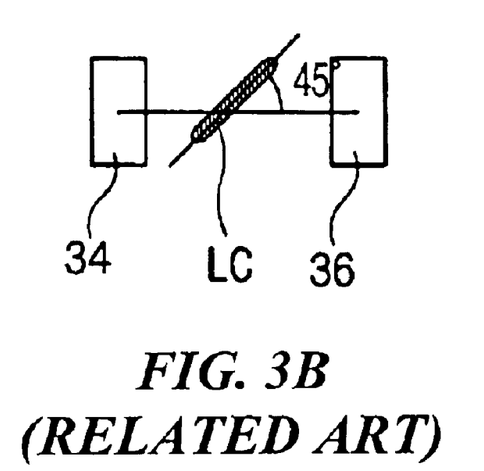

FIGS. 3A to 3D conceptually help illustrate the operation of a conventional IPS-LCD device. When no electric field is produced by the pixel and common electrodes 34 and 36, i.e., off state, as shown in FIGS. 3A and 3B, the longitudinal axes of the LC molecules "LC" are parallel and form a definite angle with the pixel and common electrodes 34 and 36. For example, FIG. 3B shows a common angle of 45 degrees between a line that is perpendicular to the pixel and common electrodes 34 and 36 and the longitudinal axes of the LC molecules.

Figure 3C:
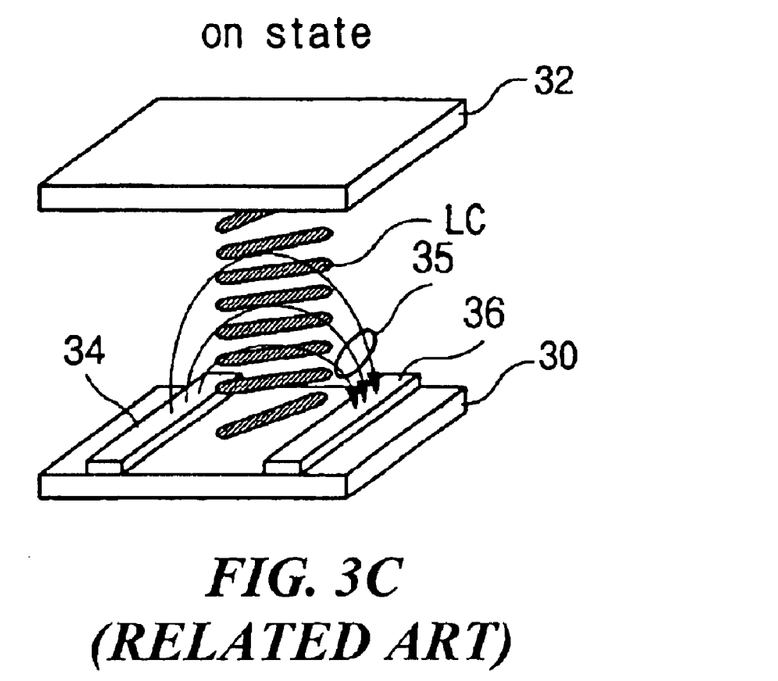
Figure 3D:
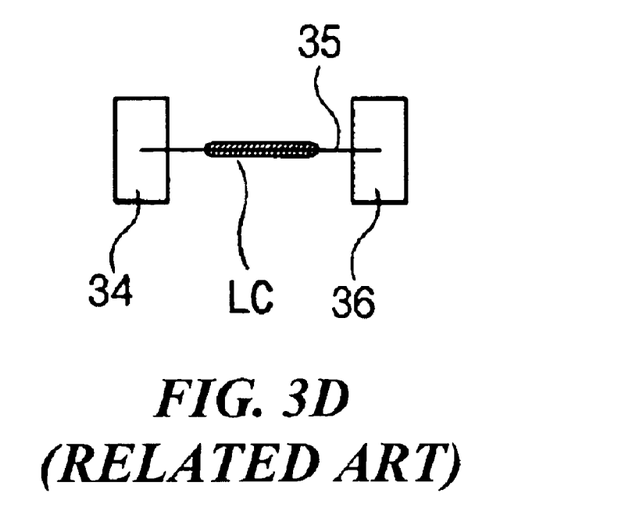

On the contrary, when an electric field is produced by the pixel and common electrodes 34 and 36, i.e., on state, as shown in FIGS. 3C and 3D, beck use the pixel and common electrodes 34 and 36 are on the lower substrate 30, an in-plane electric field 35 that is parallel to the surface of the lower substrate 30 is produced. Accordingly, the LC molecules "LC" twist to bring their longitudinal axes into coincidence with the electric field. Thus, as shown in FIG. 3D, the LC molecules align with their longitudinal axes parallel with a line perpendicular to the pixel and common electrodes 34 and 36.

In the above-mentioned IPS-LCD panel, there is no common electrode on the color filter substrate. Furthermore, since the above-mentioned IPS-LCD panel has the pixel electrode and the common electrode on the array substrate, it uses the parallel electric field to the array substrate.

Now, referring back to FIG. 2, the overcoat layer 44 is formed )n the color filter layer 42 to cover and protect the color filter layer 42. Further, the edge seal, ant 40 is formed around the periphery of the IPS-LCD panel. Although the black matrix is not shown in FIG. 2, it is formed on the upper substrate 32 surrounding the color filter layer 42. Because the IPS-LCD device produces the in-plane electric field 35, the black matrix should be made of an organic substance and not a metallic material in order to prevent the distortion of the electric field.

Furthermore, there are some problems in the edge sealant 40 and the overcoat layer 44. In general, a number of ions are contained in the edge sealant 40. As time passes, these ions migrate into the liquid crystal layer 10 after the LCD panel is complete. In other words, since the edge sealant 40 is formed of a epoxy-based resin that has a great water resistance, the edge sealant 40 includes sodium ions ($Na^+$), chlorine ions ($Cl^-$), potassium ions ($K^+$) and/or fluorine ions ($F^-$), and these ions flow out as time passes. As these ions migrate through the liquid crystal layer 10, they deteriorate the liquid crystal layer 10 and a t to cause serious defects therein, thereby shortening life of the liquid crystal layer 10.

Moreover, the color filter layer 42 contains a number of ions, but the overcoat layer 44 prevents these ions from coming out from the color filter layer 42. However, the overcoat layer 44 also contains a number of ions. The ions in the overcoat layer 44 also migrate into the liquid crystal layer 10 as time passes, thereby accelerating the deterioration of the liquid crystal layer 10. Since the overcoat layer 44 is commonly made of an acryl-based resin, this overcoat layer 44 contains sodium ions ($Na^+$), potassium ions ($K^+$), iron ions ($Fe^{2+}/Fe^{3+}$), aluminum ions ($Al^{3+}$), etc.

When the liquid crystal layer contains ions as described above, the driving voltage used to create the electric fields in the liquid crystal during operation of the liquid crystal is changed because of the presence of these ions. Accordingly, quality of the liquid crystal panel display degrades as the liquid crystal panel is used over time.

Figure 4:
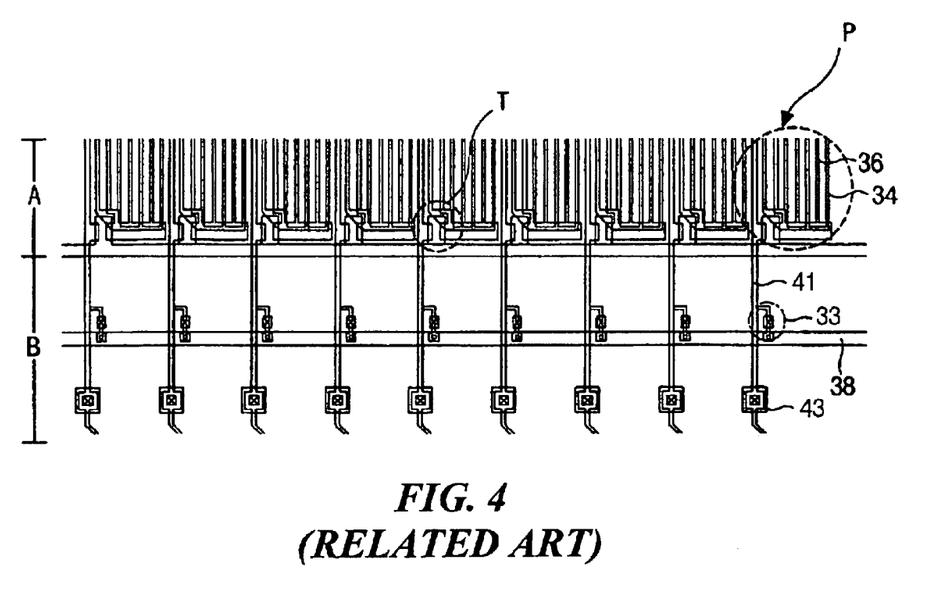
FIG. 4 is a partial plan view of an array substrate illustrating a conventional in-plane switching mode liquid crystal display device.

To overcome the display degradation caused by the migration of ions into the liquid crystal, an auxiliary line is used in a non-display area of the array substrate. FIG. 4 is a partial plan view of an array substrate illustrating a conventional in-plane switching mode liquid crystal display device that has such an auxiliary line. As shown in FIG. 4, the array substrate is divided into a pixel area "A" and a non-pixel area "B".

In the pixel area "A", a plurality of thin film transistors (TFTs) "T", a plurality of pixel electrodes 36 and a plurality of common electrodes 34 are arranged. Additionally, pixels "P" including the pixel electrodes 36 and common electrodes 34 are arranged in the pixel area "A." On the other hand, an electrostatic discharge device 33 and an auxiliary line 38 are arranged in the non-pixel area "B". Furthermore, a plurality of data lines 41 are perpendicularly arranged in both the pixel area "A" and the non-pixel area "B". Each data line 41 is connected to each data pad 43 in the non-pixel area "B".

Within the configuration shown in FIG. 4, the auxiliary line 38 receives a signal that is applied to the common electrodes 34, such that the ions flowing from the edge sealant 40 and overcoat layer 44 are trapped by the auxiliary line 38. The electrostatic discharge device 33 between each pixel "P" and each data pad 43 is disposed at a distance of about 160 micrometers from the pixels "P." The electrostatic discharge device 33 also discharges the static electricity occurring during the manufacturing processes. Although not shown in FIG. 4, repair lines and other lines for electric circuits are also arranged in the non-pixel area "B".

Further in the array substrate shown in FIG. 4, although the patterned metal of the electrostatic discharge device 32 may not receive the electric signals, the patterned metal may have an induced potential when the patterned metal is exposed to the electric field. Therefore, the liquid crystals are deteriorated and the induced potential causes and accelerates the dielectric polarization of the liquid crystals. Further, the induced potential accelerates the polarization of impurities included in the liquid crystal layer. Accordingly, the liquid crystal molecules are misaligned in the array substrate and the image quality of the LCD device degrades. Namely, the polarization caused by the induced potential directly affects the arrangement of the liquid crystal molecules in the pixel area "A" and thus causes the degradation of the display quality.

SUMMARY OF THE INVENTION

Accordingly, the present invention is directed to an array substrate for a liquid crystal display device that substantially obviates one or more of the problems due to limitations and disadvantages of the related art.

An advantage of the present invention is to provide a liquid crystal display device having a stable image display.

Another advantage of the present invention is to provide an array substrate for a liquid crystal display device, which has a structure that prevents a liquid crystal layer from being deteriorated.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

In order to achieve these and other advantages, an embodiment n accordance with the principles of the present invention provides an array substrate for a liquid crystal display device that includes a substrate that is divided into a display area and a non-display area; a plurality of pixels in the display area; a plurality of switching devices on the substrate, each switching device disposed in each pixel; first and second lines that apply signals to each switching device; a plurality of first electrodes on the substrate, each first electrode connected to each switching device; a plurality of second electrodes on the substrate, each second electrode spaced apart from each first electrode; a plurality of electrostatic discharge devices arranged in the non-display area, wherein each electrostatic discharge device is at a distance of more than one pixel pitch; a plurality of pads arranged in the non-display area; a plurality of first connecting lines each connecting each pixel to each electrostatic discharge device; and a plurality of second connecting lines each connecting each electrostatic discharge device to each pad.

In the above-mentioned arrays substrate, the switching device includes a thin film transistor, the first line includes a gate line, the second line includes a data line, the first electrodes include a pixel electrode, and the second electrodes includes a common electrode.

The above one pixel pitch ranges from 1 millimeter to 1.5 millimeters. Each pad is at intervals of 1 to 2.5 millimeters from each electrostatic discharge device. Beneficially, each first connecting line receives signal voltage of inverted phase.

The above-mentioned array substrate further includes an auxiliary line that connects the plurality of electrostatic discharge devices and receives a signal applied to the second electrode.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate an embodiment of the present invention and together with the description serve to explain the principles of that invention.

In the drawings.

DETAILED DESCRIPTION OF THE ILLUSTRATED EMBODIMENTS

Reference will now be made in detail to an illustrated embodiment of the present invention, an example of which is shown in the accompanying drawings. Wherever possible, similar reference numbers will be used throughout the drawings to refer to the same or similar parts.

Figure 5:
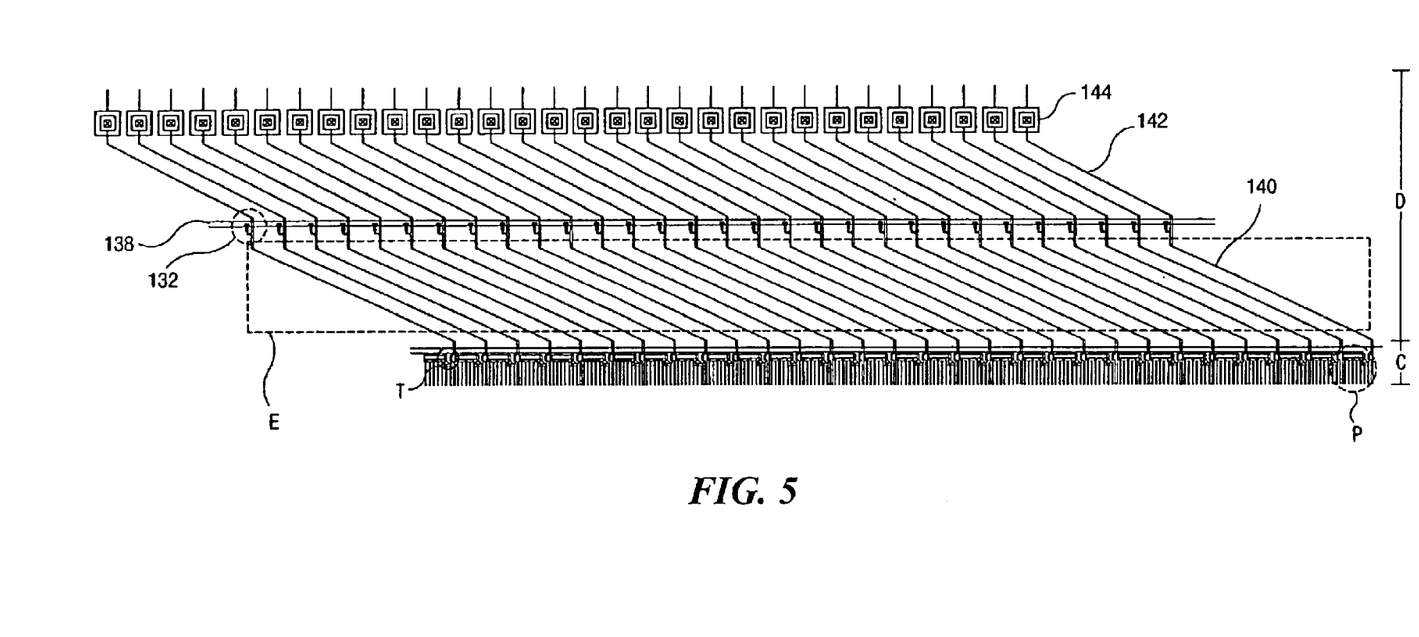
FIG. 5 is a partial plan view illustrating the periphery of an array substrate for use in an in-plane switching mode liquid crystal display device according to the present invention.

FIG. 5 is a partial plan view illustrating the periphery of an array substrate for use in an in-plane switching mode liquid crystal display (IPS-LCD) device according to the present invention. As shown in FIG. 5, the array substrate is divided into a display area "C" (i.e., a pixel area) and a non-display area "D" (i.e., a non-pixel area).

In the display area "C", a plurality of thin film transistors (TFTs) "T" and a plurality of pixels "P" each including pixel electrodes and common electrodes are arranged. A plurality of electrostatic discharge devices 132 and an auxiliary line 138 are arranged in the non-display area "D". Furthermore, a plurality of data pads 144 are arranged at the periphery of the non-display area "D." A plurality of first connecting lines 140 each connecting each pixel "P" to each electrostatic discharge device 132 are then arranged in the non-display area "D." A plurality of second connecting lines 142 are arranged between the electrostatic discharge device 132 and the data pads 144 such that each respective second connecting line 142 connects each respective electrostatic discharge device 132 to each respective data pad 144 in the non-display area "D."

Within the configuration shown in FIG. 5, the auxiliary line 138 receives a signal that is applied to the common electrodes of the pixel "P." The plurality of electrostatic discharge devices 132 in the non-display area "D" are arranged essentially further away from the display area "C" In other words, each electrostatic discharge device 132 is at a distance of 1 to 1.5 millimeters (mm) from each pixel "P" of the display area "C". The intervals between the electrostatic discharge devices 132 and the pixels "P" should be so far that the liquid crystals in the display area "C" are not affected by any induced potential occurring, in the electrostatic discharge devices 132. Additionally, the size of the non-display area "D" is quite considerable to leave a space between the electrostatic devices 132 and the pixels "P."

Still referring to FIG. 5, each data pad 144 is at intervals of about 1 to about 2.5 millimeters (mm) from each electrostatic discharge device 132. Although not shown in FIG. 5, other peripheral electric circuits and lines are also at almost equal distances from the electrostatic discharge devices 132 to the data pads 144. This interval (i.e., about 1 to about 2.5 mm) is defined in due consideration of the effect of the induced potential and the size of the non-display area "D," as described above.

As a result of the configuration shown in FIG. 5, any induced potential and electric field do not affect the liquid crystal molecules in the display area "C" even though these occur in the electrostatic discharge devices 132 and other peripheral electric circuits and lines. Furthermore, if the induced potential and electric field are generated and cause accelerating the polarization of the liquid crystal molecules, the induced potential and electric field are obstructed in an offset area "E" because each connection line 140 receives the signal voltage of inverted phase. Namely, since the electrostatic discharge devices 132 are at the distance of about 1 to 1.5 mm, which is more than the pixel pitch, and the offset area "E" is formed in the interval between the pixels "P" and the electrostatic discharge devices 132, the induced potential and electric field occurring in the electrostatic discharge devices 132 and other peripheral electric circuits and lines do not affect the display in the display area "C."

Accordingly, the reliability of liquid crystal display device increases, and the lifetime of liquid crystal layer is lengthened. Also, the stained image and dummy pixel are not presented in the periphery of the LCD panel, thereby increasing the display quality of the liquid crystal display device. Furthermore, this structure and configuration of the present invention can be adopted not only in the IPS-LCD device, but also in the other types of LCD devices.

It will be apparent to those skilled in the art that various modifications ions and variation can be made in the array substrate of the present invention without departing from the spirit or scope of the invention. Thus, it is intended that the present invention cover the modifications and variations of this invention provided they come within the scope of the appended claims and their equivalents.

What is claimed is:

1. An in-plane switching liquid crystal display device, comprising:
    a substrate having a display region and a non-display region;
    a plurality of pixels in the display region;
    a plurality of first and second electrodes on the substrate such that an electric field is formed between the first and second electrodes substantially parallel to the substrate when a voltage is applied to the first and second electrodes;
    a plurality of electrostatic discharge devices in the non-display region, wherein each electrostatic discharge device is at a distance of more than one pixel pitch from the pixels;
    a plurality of first connecting lines in the non-display region, each first connecting line connecting a pixel to one of the electrostatic discharge devices,
    a plurality of second connecting lines in the non-display region; and
    a plurality of pads in the non-display region,
    wherein one electrostatic discharge device is located between one of the first connecting lines and one of the second connecting lines,
    wherein each pad is between about 1 to about 2.5 millimeters from each electrostatic discharge device.

2. The device of claim 1, further comprising a plurality of switching devices on the substrate.

3. The device of claim 2, wherein each switching device is disposed in each pixel.

4. The device of claim 2, wherein the switching device includes a thin film transistor.

5. The device of claim 1, further comprising first and second lines on the substrate.

6. The device of claim 5, wherein the first and second lines apply signals to each switching device.

7. The device of claim 6, wherein the first line includes a gate line.

8. The device of claim 6, wherein the second line includes a data line.

9. The device of claim 1, wherein the first electrodes include a pixel electrode.

10. The device of claim 1, wherein the second electrodes includes a common electrode.

11. The device of claim 1, wherein one pixel pitch is between about 1 mm to about 1.5 mm.

12. The device of claim 1, wherein each second connecting line connects each electrostatic discharge device to each pad.

13. The device of claim 1, wherein a voltage of the first connecting lines is different from a voltage of the electrostatic discharge devices.

14. The device of claim 1, wherein each first connecting line receives signal voltage of inverted phase.

15. The device of claim 1, further comprising an auxiliary line in the non-display region.

16. The device of claim 15, wherein the auxiliary line connects each of the electrostatic discharge devices.

17. The device of claim 15, wherein the auxiliary line receives a signal applied to the second electrode.

* * * * *